United States Patent
Zhao et al.

(10) Patent No.: US 10,764,738 B2
(45) Date of Patent: Sep. 1, 2020

(54) WIRELESS COMMUNICATION CONNECTION METHOD AND TERMINAL

(71) Applicant: Huawei Technologies Co., Ltd., Shenzhen (CN)

(72) Inventors: Peng Zhao, Xi'an (CN); Feng Chen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/494,527

(22) PCT Filed: Jun. 28, 2017

(86) PCT No.: PCT/CN2017/090555
§ 371 (c)(1),
(2) Date: Sep. 16, 2019

(87) PCT Pub. No.: WO2018/166103
PCT Pub. Date: Sep. 20, 2018

(65) Prior Publication Data
US 2020/0015064 A1    Jan. 9, 2020

(30) Foreign Application Priority Data
Mar. 14, 2017    (CN) .......................... 2017 1 0149964

(51) Int. Cl.
*H04B 7/00* (2006.01)
*H04W 8/00* (2009.01)
(Continued)

(52) U.S. Cl.
CPC ........... *H04W 8/005* (2013.01); *H04L 9/0869* (2013.01); *H04L 61/1594* (2013.01); *H04W 4/21* (2018.02);
(Continued)

(58) Field of Classification Search
CPC ....... H04W 8/005; H04W 4/21; H04W 76/14; H04W 4/80; H04W 76/11;
(Continued)

(56) References Cited

U.S. PATENT DOCUMENTS 9,402,274 B1    7/2016  Rajurkar et al.
2009/0111378 A1*  4/2009  Sheynman ............ H04W 8/005
                                                        455/41.1
(Continued)

FOREIGN PATENT DOCUMENTS

CN    101347029 A    1/2009
CN    103209406 A    7/2013
(Continued)

OTHER PUBLICATIONS

Machine Translation and Abstract of Chinese Publication No. CN103209406, Jul. 17, 2013, 15 pages.
(Continued)

*Primary Examiner* — Sonny Trinh
(74) *Attorney, Agent, or Firm* — Conley Rose, P.C.

(57) ABSTRACT

A wireless communication coupling method and a terminal, where the method includes selecting, by a first terminal, a wireless coupling mode in a target application, determining a target identifier in an identifier list of the target application, sending, using a wireless network, a wireless coupling request for the wireless coupling mode to a second terminal corresponding to the target identifier, and establishing a wireless communication coupling in the wireless coupling mode to the second terminal when receiving an acknowledgement response to the wireless coupling request.

17 Claims, 9 Drawing Sheets

(51) Int. Cl.

| | |
|---|---|
| *H04W 4/21* | (2018.01) |
| *H04W 76/14* | (2018.01) |
| *H04W 4/80* | (2018.01) |
| *H04W 76/11* | (2018.01) |
| *H04W 12/04* | (2009.01) |
| *H04L 9/08* | (2006.01) |
| *H04L 29/12* | (2006.01) |
| *H04W 88/06* | (2009.01) |

(52) U.S. Cl.
CPC ....... *H04W 4/80* (2018.02); *H04W 12/04071* (2019.01); *H04W 76/11* (2018.02); *H04W 76/14* (2018.02); *H04L 61/6022* (2013.01); *H04W 88/06* (2013.01)

(58) Field of Classification Search
CPC ............ H04W 12/04071; H04W 88/06; H04L 9/0869; H04L 61/1594; H04L 61/6022
USPC ....................................................... 455/41.2
See application file for complete search history.

(56) References Cited

U.S. PATENT DOCUMENTS

| | | |
|---|---|---|
| 2009/0215398 A1 | 8/2009 | Adler et al. |
| 2009/0327713 A1 | 12/2009 | Marin et al. |
| 2016/0344712 A1* | 11/2016 | Ding .................... H04W 76/14 |
| 2017/0078331 A1* | 3/2017 | Walline .................. H04L 63/20 |

FOREIGN PATENT DOCUMENTS

| | | |
|---|---|---|
| CN | 103248956 A | 8/2013 |
| CN | 103607780 A | 2/2014 |
| CN | 103684546 A | 3/2014 |
| CN | 104601205 A | 5/2015 |
| EP | 1487224 A1 | 12/2004 |
| WO | 2016151995 A1 | 9/2016 |

OTHER PUBLICATIONS

Machine Translation and Abstract of Chinese Publication No. CN103607780, Feb. 26, 2014, 15 pages.
Machine Translation and Abstract of Chinese Publication No. CN103684546, Mar. 26, 2014, 12 pages.
Machine Translation and Abstract of Chinese Publication No. CN104601205, May 6, 2015, 35 pages.
Foreign Communication From a Counterpart Application, PCT Application No. PCT/CN2017/090555, English Translation of International Search Report dated Nov. 17, 2017, 2 pages.
Foreign Communication From a Counterpart Application, PCT Application No. PCT/CN2017/090555, English Translation of Written Opinion dated Nov. 17, 2017, 4 pages.

* cited by examiner

WIRELESS COMMUNICATION CONNECTION METHOD AND TERMINAL

CROSS-REFERENCE TO RELATED APPLICATIONS

This patent application is a U.S. National Stage of International Patent Application No. PCT/CN2017/090555 filed on Jun. 28, 2017, which claims priority to Chinese Patent Application No. 201710149964.6 filed on Mar. 14, 2017. Both of the aforementioned applications are hereby incorporated by reference in their entireties.

TECHNICAL FIELD

The present invention relates to the field of communications technologies, and in particular, to a wireless communication connection method and a terminal.

BACKGROUND

With continuous development of communications technologies, terminals (such as smartphones, wearable devices, and tablet computers) are becoming increasingly necessary tools in people's daily life and learning.

Currently, data exchange is usually performed by using terminals, requiring establishment of a wireless communication connection. In an existing wireless communication connection manner, a user needs to manually enter a dedicated setting interface of a terminal to turn on a corresponding wireless connection mode (for example, a Bluetooth mode or a Wi-Fi mode), and then manually select another terminal to connect when learning of information such as a name or an address of the another terminal in the wireless connection mode. In this case, if the another terminal has not turned on the corresponding wireless connection mode, the terminal cannot find the another terminal through scanning, and consequently, cannot establish a wireless communication connection. Therefore, the foregoing manner has problems such as a complex operation process and relatively low terminal intelligence.

SUMMARY

Embodiments of the present invention provide a wireless communication connection method and a terminal to help simplify an operation process and improve terminal intelligence.

According to a first aspect, an embodiment of the present invention provides a wireless communication connection method. The first terminal first selects a wireless connection mode in a target application, then determines a target identifier in an identifier list of the target application, sends, by using a wireless network, a wireless connection request for the wireless connection mode to a second terminal corresponding to the target identifier, and establishes a wireless communication connection in the wireless connection mode to the second terminal when receiving an acknowledgement response to the wireless connection request.

It can be learned that according to the method provided in the first aspect, the first terminal establishes the wireless communication connection in the wireless connection mode in the target application. Therefore, a user neither needs to manually turn on the corresponding wireless connection mode on a dedicated setting interface nor needs to learn of information such as a name or an address of the second terminal in the wireless connection mode in advance. This can simplify an operation process and improve terminal intelligence.

In an optional implementation, the connection acknowledgement response to the connection request includes a random number generated by the second terminal in the wireless connection mode. The establishing, by the first terminal, a wireless communication connection in the wireless connection mode to the second terminal may be specifically: First, the first terminal performs local connection interaction for the wireless connection mode with the second terminal by using the random number, to obtain an encryption key of the second terminal in the wireless connection mode. Then, the first terminal establishes the wireless communication connection in the wireless connection mode to the second terminal based on the encryption key of the second terminal.

It can be learned that according to the foregoing optional implementation, the first terminal interacts with the second terminal by using the random number to obtain the encryption key of the second terminal, and establishes the wireless communication connection to the second terminal, thereby enriching wireless communication connection establishment manners and improving terminal intelligence.

In an optional implementation, the connection acknowledgement response to the connection request includes an encryption key of the second terminal in the wireless connection mode. The establishing, by the first terminal, a wireless communication connection in the wireless connection mode to the second terminal may be specifically: The first terminal establishes the wireless communication connection in the wireless connection mode to the second terminal based on the encryption key of the second terminal.

It can be learned that according to the foregoing optional implementation, the first terminal directly obtains the encryption key of the second terminal, and can establish the wireless communication connection to the second terminal without performing local connection interaction with the second terminal, thereby enriching wireless communication connection establishment manners and improving terminal intelligence.

In an optional implementation, the connection acknowledgement response to the connection request includes a MAC address of the second terminal. The establishing, by the first terminal, a wireless communication connection in the wireless connection mode to the second terminal may be specifically: The first terminal first turns on the wireless connection mode when receiving the connection acknowledgement response to the connection request, and determines, when receiving a request for the wireless connection mode, whether a MAC address in the request for the wireless connection mode is the MAC address of the second terminal. If the MAC address in the request for the wireless connection mode is the MAC address of the second terminal, the first terminal establishes the wireless communication connection in the wireless communication mode to the second terminal.

It can be learned that according to the foregoing optional implementation, the first terminal may establish the wireless communication connection in the wireless communication mode to the second terminal when determining that the MAC address in the request for the wireless connection mode is the MAC address of the second terminal. This can prevent wrong access of another terminal and improve terminal intelligence.

In an optional implementation, the method further includes: When receiving the connection acknowledgement response to the connection request, the first terminal sends a MAC address of a third terminal to the second terminal, and controls the third terminal to enter the wireless connection mode, so that the second terminal establishes a wireless communication connection based on the MAC address of the third terminal when turning on the wireless connection mode.

It can be learned that according to the foregoing optional implementation, the first terminal may control the third terminal to establish a wireless communication connection to the second terminal, thereby enriching functions of the first terminal and improving terminal intelligence.

In an optional implementation, the wireless connection mode may include any one or more of a Bluetooth based connection mode, a WPS based connection mode, and a Wi-Fi based connection mode.

In an optional implementation, the wireless network may include a cellular mobile data network and/or a wireless local area network.

According to a second aspect, a terminal is provided. The terminal has a function of implementing an action of the terminal in the possible implementations of the first aspect. The function may be implemented by using hardware, or may be implemented by hardware executing corresponding software. The hardware or software includes one or more modules corresponding to the foregoing function. The modules may be software and/or hardware. Based on a same inventive concept, for a principle of resolving a problem by the terminal and beneficial effects, refer to the first aspect, the possible method implementations of the first aspect, and beneficial effects arising. Therefore, for implementation of the terminal, refer to the first aspect and the possible method implementations of the first aspect. Repeated parts are not described again.

According to a third aspect, a terminal is provided. The terminal includes: a memory, configured to store one or more programs; and a processor, configured to invoke the program stored in the memory to implement the solutions in the method designs in the first aspect. For implementations used by the terminal to resolve a problem and beneficial effects of the terminal, refer to the first aspect, the possible method implementations of the first aspect, and beneficial effects. Repeated parts are not described again.

According to a fourth aspect, a computer program product is provided. When running on a computer, the computer program product enables the computer to perform the method in the first aspect and the possible method implementations of the first aspect.

DESCRIPTION OF EMBODIMENTS

Embodiments of the present invention will be described below with reference to accompanying drawings of the embodiments of the present invention.

In an existing actual application, if a first terminal needs to establish a wireless communication connection in a wireless communication mode to a second terminal, a user needs to manually enter a dedicated setting interface of the first terminal to turn on a corresponding wireless connection mode (for example, a Bluetooth mode or a Wi-Fi mode), manually initiate scanning on the dedicated setting interface, and manually select the second terminal to connect when learning of information such as a name or an address of the second terminal in the wireless connection mode. In this case, if the second terminal has not turned on the corresponding wireless connection mode, the first terminal cannot find the second terminal through scanning, and consequently cannot establish the wireless communication connection in the wireless communication mode. It is relatively difficult for a common user to enable a terminal to enter a state in which the terminal can be found through scanning. The user may need to check a manual of the terminal to learn of the method. In addition, excessive manual operations cause a very complex process of establishing a wireless communication connection between terminals, leading to relatively low terminal intelligence.

Therefore, the embodiments of the present invention provide a wireless communication connection method and a terminal, so as to simplify an operation process and improve terminal intelligence. To better understand the wireless communication connection method and the terminal provided in the embodiments of the present invention, a network architecture in the embodiments of the present invention is first described below.

Figure 1:
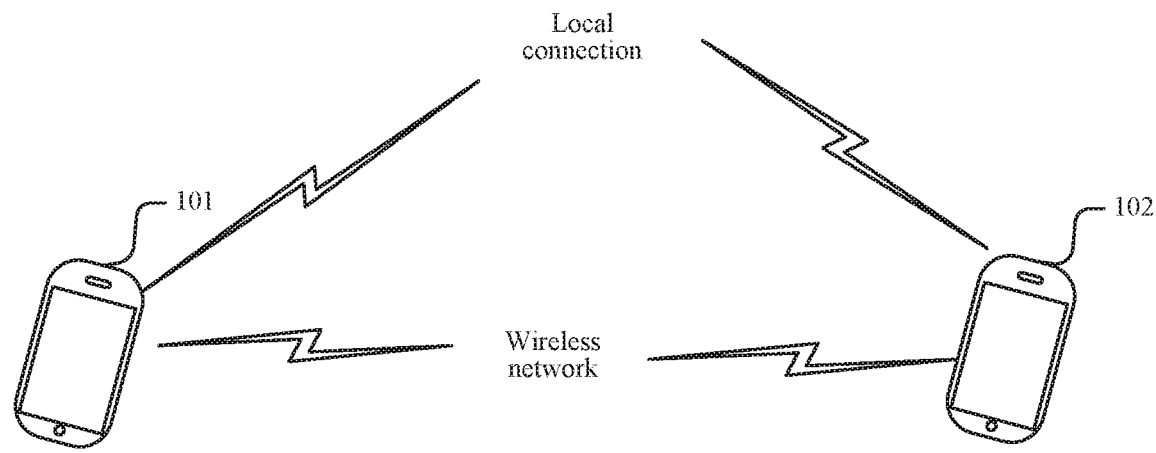
FIG. 1 is a schematic diagram of a network architecture for wireless communication connection according to an embodiment of the present invention.

FIG. 1 is a schematic diagram of a network architecture for wireless communication connection according to the present invention. In an embodiment of the present invention, the network architecture includes a first terminal 101 and a second terminal 102. The first terminal 101 and the second terminal 102 may be various intelligent terminals, for example, terminals having a communication function, such as smartphones, tablet computers, wearable devices, computers, personal digital assistants (English: Personal Digital Assistant, PDA for short), or mobile Internet devices (English: Mobile Internet Device, MID for short).

In the schematic diagram of the network architecture for wireless communication connection shown in FIG. 1, the first terminal 101 first selects a wireless connection mode in a target application of the first terminal 101. For example, the target application is a social application, and the wireless connection mode is a Bluetooth based connection mode. In this case, the first terminal 101 first selects a Bluetooth based connection mode in the social application.

Further, the first terminal 101 may determine a target identifier (for example, a contact name in a contact list) in an identifier list (for example, the contact list) of the social application, and send, by using a wireless network (for example, Wi-Fi or a cellular mobile network), a wireless connection request for the wireless connection mode to the second terminal 102 corresponding to the target identifier.

The request may include a parameter (for example, a MAC address or a user identifier (for example, a user account in the target application or a user name in the target application) of the first terminal 101) of the first terminal 101 that is required for establishing the wireless communication connection.

Further, both the second terminal 102 and the first terminal 101 need to install the target application. The second terminal 102 receives, in the target application, the wireless connection request for the wireless connection mode by using the wireless network. If a user of the second terminal 102 determines to establish the wireless communication connection to the first terminal 101, the second terminal 102 may generate a connection acknowledgement response to the wireless connection request, and send the connection acknowledgement response to the first terminal 101 by using the wireless network.

The target application installed on the second terminal 102 and the target application installed on the first terminal 101 may be the same or different. This is not limited in the present invention.

It should be noted that the connection acknowledgement response to the wireless connection request may include a parameter (for example, a MAC address, a random number, or an encryption key of the second terminal 102) of the second terminal 102 that is required for establishing the wireless communication connection.

It should be noted that if the user of the second terminal 102 determines to establish the wireless communication connection to the first terminal 101, when the user grants the wireless connection request on the first terminal 102, the second terminal 102 automatically turns on a wireless connection mode on the second terminal 102. In this case, the second terminal 102 may automatically turn on the wireless connection mode requested by the first terminal 101. For example, the first terminal 101 requests to establish a Bluetooth-based wireless communication connection to the second terminal 102. If Bluetooth on the second terminal 102 has not been turned on when the user of the second terminal 102 grants establishment of the wireless communication connection by the first terminal 101, the second terminal 102 may automatically turn on Bluetooth.

Further, when the first terminal 101 receives, by using the wireless network, the connection acknowledgement response to the wireless connection request that is sent by the second terminal 102, after the first terminal 101 receives the response, the first terminal 101 may automatically turn on the wireless connection mode on the first terminal 101, and then may perform a local pairing process for the wireless connection mode with the second terminal 102 by using a local connection (where if the connection acknowledgement response includes some particular parameters such as an encryption key, the first terminal 101 can be directly paired with the second terminal 102 successfully, with no need to perform the local pairing process with the second terminal 102 by using the local connection). After both the parties are successfully paired, the first terminal 101 may establish the wireless communication connection in the wireless connection mode to the second terminal 102.

In the architectural diagram shown in FIG. 1, the first terminal 101 may initiate the wireless connection request for the wireless connection mode to the second terminal 102 by using the target application, and exchange, with the second terminal 102 by using the wireless network, a parameter required for establishing the wireless communication connection, so as to directly enter the pairing process in a case of the local connection based on the parameter (where if the parameter is a particular parameter, the pairing process in the case of the local connection may be omitted). After the pairing is completed, the first terminal 101 establishes the wireless communication connection in the wireless connection mode to the second terminal 102. A user of the first terminal 101 may not need to learn of the parameter such as the MAC address or a name of the second terminal 102 in the wireless communication mode. The users of the two terminals may establish the wireless communication connection in the wireless connection mode, with no need to turn on the corresponding wireless connection mode on the dedicated setting interface and select a corresponding terminal, thereby simplifying operation processes of the users and improving terminal intelligence.

Figure 2:
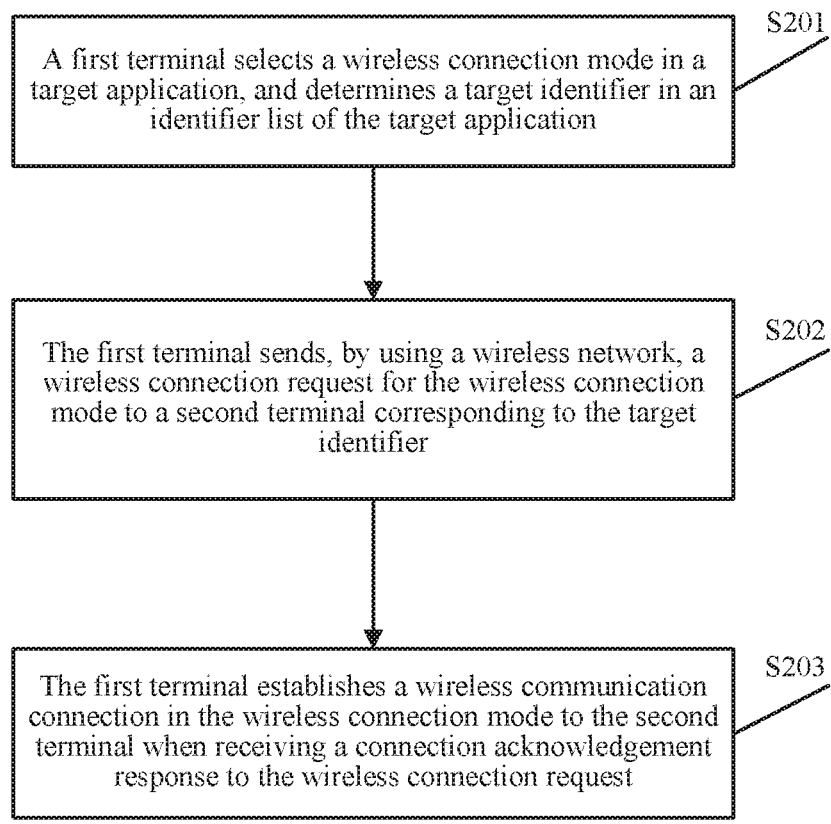
FIG. 2 is a schematic flowchart of a wireless communication connection method according to an embodiment of the present invention.

FIG. 2 is a schematic flowchart of a wireless communication connection method according to an embodiment of the present invention. As shown in FIG. 2, this embodiment of the present invention includes the following steps.

S201. A first terminal selects a wireless connection mode in a target application, and determines a target identifier in an identifier list of the target application.

It should be noted that the wireless connection mode may be a mode used by the first terminal to wirelessly connect to another terminal. One or more wireless connection modes may be set in the target application. A user may select one wireless connection mode from a plurality of wireless connection modes in the target application.

Optionally, the wireless connection mode includes any one or more of a Bluetooth based connection mode and a Wi-Fi based connection mode.

The Wi-Fi based connection mode includes a WPS based connection mode and a PIN code based connection mode.

It should be noted that the target application may be a social application or an application of another type downloaded by the first terminal in advance, or may be communications software on the first terminal. This is not limited in the present invention herein.

It should further be noted that the identifier list of the target application may be a contact name list, a contact list, a contact photo list, or the like stored in the target application. This is not limited in the present invention herein.

During specific implementation, the user may select a wireless connection mode in the target application by using the first terminal, and determine the target identifier in the identifier list of the target application.

In some feasible implementations, the first terminal may alternatively automatically select a wireless connection mode with the highest historical selection frequency and determine a target identifier with the highest historical selection frequency based on historical selection frequency of the user for wireless connection modes and target identifiers, and send a prompt message to the user. If the user acknowledges the prompt message, the first terminal may perform step 202 and step 203. In this way, the user does not need to perform a selection step and then perform a determining step each time, simplifying operations steps of the user.

S202. The first terminal sends, by using a wireless network, a wireless connection request for the wireless connection mode to a second terminal corresponding to the target identifier.

Optionally, the wireless network includes a cellular mobile data network and/or a wireless local area network.

The cellular mobile data network may be a 2G network, a 3G network, a 4G network, or even a 5G network or the like. The wireless local area network may be a WLAN, Wi-Fi, or the like.

It should be noted that a manner of determining, by the first terminal, the second terminal corresponding to the target identifier may be: A same target application is also installed on the second terminal, and the target application on the first terminal is associated with the target application on the second terminal to some extent (for example, the first terminal sends a message to a contact in the target application, if the contact in the target application performs logging on the second terminal, the contact may receive the message in the target application on the second terminal). In this way, the target identifier can correspond to the second terminal.

It should further be noted that the wireless connection request for the wireless connection mode may include: a connection request command, used to notify the second terminal of a wireless communication connection in a wireless connection mode of which type that the first terminal requests to establish with the second terminal; and a MAC address of the first terminal, used to pair the second terminal with the first terminal in a case of a local connection. Certainly, the request may further include another type of parameter. This is not limited in the present invention.

During specific implementation, after selecting the target identifier, the first terminal may send, by using the wireless network, the wireless connection request for the wireless connection mode to the second terminal corresponding to the target identifier. Then, the second terminal receives, by using the wireless network, the wireless connection request in the target application on the second terminal, and determines whether to establish the wireless communication connection to the first terminal.

S203. The first terminal establishes a wireless communication connection in the wireless connection mode to the second terminal when receiving a connection acknowledgement response to the wireless connection request.

It should be noted that the connection acknowledgement response to the wireless connection request is sent by the second terminal. The second terminal may send the connection acknowledgement response to the wireless connection request after a user using the second terminal determines to establish the wireless communication connection to the first terminal. Alternatively, the second terminal may directly send the connection acknowledgement response to the wireless connection request after receiving the wireless connection request. Certainly, the foregoing manners are merely examples but are not exhaustive. The present invention includes but is not limited to the foregoing optional manners.

Specifically, the second terminal may automatically send the connection acknowledgement response, for example, may automatically perform acknowledgement (where the user does not need to perform acknowledgement manually) immediately when receiving the wireless connection request of the terminal. Alternatively, the second terminal may be set to automatically perform acknowledgement (where the user does not need to perform acknowledgement manually) when receiving a wireless connection request sent by a user in a group. For example, the second terminal may automatically send the connection acknowledgement response when receiving a connection request sent by using a user identifier in a user group such as friends or family in the target application. Certainly, the foregoing manners are merely examples but are not exhaustive. The present invention includes but is not limited to the foregoing optional manners.

In some feasible implementations, after sending the wireless connection request for the wireless connection mode to the second terminal, the first terminal may detect whether the wireless connection mode on the first terminal has been turned on. If the wireless connection mode has not been turned on, the first terminal automatically turns on the wireless connection mode. If the wireless connection mode has been turned on, the first terminal keeps the wireless connection mode in the turn-on state.

In some feasible implementations, when sending the connection acknowledgement response to the wireless connection request, the second terminal may also detect whether the wireless connection mode on the second terminal has been turned on. If the wireless connection mode has not been turned on, the second terminal automatically turns on the wireless connection mode. If the wireless connection mode has been turned on, the second terminal keeps the wireless connection mode in the turn-on state.

It should further be noted that a specific manner of establishing, by the first terminal, the wireless communication connection in the wireless connection mode to the second terminal may be: Both the first terminal and the second terminal turn on the wireless connection mode, and then establish the wireless communication connection in the wireless connection mode by using a parameter in the connection request and a parameter in the connection acknowledgement response.

The wireless communication connection may be a point-to-point wireless communication connection, for example, a Bluetooth communication connection. Alternatively, the wireless communication connection may be a multi-point wireless communication connection, for example, a Wi-Fi communication connection. The Wi-Fi communication connection may include a WPS communication connection and a PIN code communication connection.

In this embodiment of the present invention, the first terminal may initiate, to the second terminal, the wireless connection request for the wireless connection mode by using the target application, and receive the connection acknowledgement response of the second terminal by using the wireless network. In addition, in this process a parameter required for establishing the wireless communication connection is exchanged. In this way, the first terminal may establish the wireless communication connection in the wireless connection mode to the second terminal. A user of the first terminal may establish the wireless communication connection in the wireless connection mode, with no need to learn of the parameter such as the MAC address or a name of the second terminal in the wireless communication mode or to turn on the corresponding wireless connection mode on a dedicated setting interface and select a corresponding terminal, thereby simplifying an operation process of the user and improving terminal intelligence.

Figure 3:
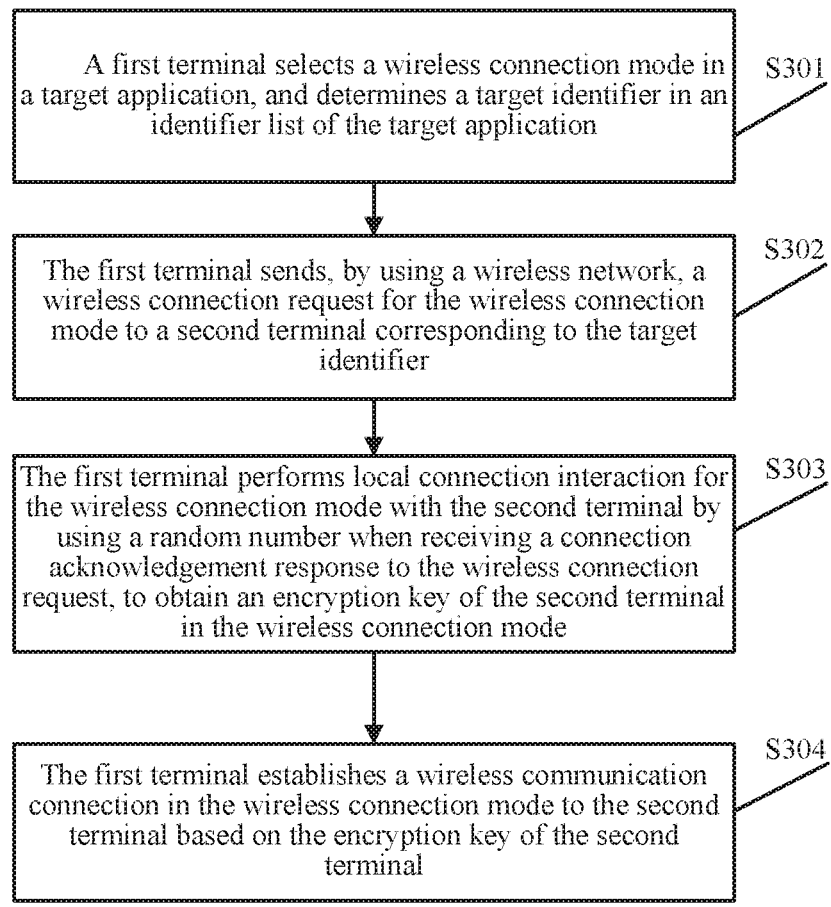
FIG. 3 is a schematic flowchart of another wireless communication connection method according to an embodiment of the present invention.

FIG. 3 is a schematic flowchart of another wireless communication connection method according to an embodiment of the present invention. The method in this embodiment of the present invention may include the following steps.

S301. A first terminal selects a wireless connection mode in a target application, and determines a target identifier in an identifier list of the target application.

S302. The first terminal sends, by using a wireless network, a wireless connection request for the wireless connection mode to a second terminal corresponding to the target identifier.

It should be noted that the wireless connection request may include one or more parameters used to establish a wireless communication connection, such as a MAC address of the first terminal and a connection command.

It should be noted that for a specific implementation process of step S301 and step S302 in this embodiment of the present invention, refer to step S201 and step S202 in the embodiment corresponding to FIG. 2, and details are not described herein again.

S303. The first terminal performs local connection interaction for the wireless connection mode with the second terminal by using a random number when receiving a connection acknowledgement response to the wireless connection request, to obtain an encryption key of the second terminal in the wireless connection mode.

The connection acknowledgement response to the connection request may include a random number generated by the second terminal in the wireless connection mode.

It should be noted that the random number may be a number randomly sent by the second terminal to the first terminal. There may be any quantity of numbers, such as 3 numbers or 5 numbers. This is not limited in the present invention.

During specific implementation, the second terminal sends the connection acknowledgement response to the first terminal by using the wireless network. The connection acknowledgement response includes the random number. Then, both parties may perform local connection interaction for the wireless connection mode with each other, that is, may use parameters such as the random number and the MAC address of the first terminal as input, to obtain the encryption key of the second terminal through algorithm processing.

In some feasible implementations, first, the second terminal may encapsulate the random number into the connection acknowledgement response, and send the connection acknowledgement response to the first terminal. Then, the second terminal generates the encryption key K2, next, uses the random number to encrypt the encryption key K2 according to an encryption algorithm, to obtain ciphertext M2, and then sends the ciphertext M2 to the first terminal by using a local connection (for example, a Bluetooth connection). After receiving the ciphertext M2, the first terminal uses the random number (encapsulated into the connection acknowledgement response) to decrypt the ciphertext M2 according to the encryption algorithm, to obtain the key K2. According to the foregoing manner, both the first terminal and the second terminal have the encryption key K2. The first terminal and the second terminal may encrypt and decrypt data by using the encryption key K2.

In some feasible implementations, the first terminal and the second terminal separately use the random number as a parameter to generate the encryption key locally according to the encryption algorithm. The first terminal and the second terminal may use the encryption key K2 to encrypt and decrypt data.

The encryption algorithm may be any type of algorithm. This is not limited in this embodiment of the present invention.

It should further be noted that in this embodiment of the present invention, the random number and various local interaction methods may be used to obtain the encryption key. A specific manner of obtaining the encryption key is not limited in this embodiment of the present invention.

It should further be noted that because the random number is sent by the second terminal to the first terminal, the random numbers of both the parties are the same. In this case, both the parties may use the random number to perform local connection interaction for the wireless connection mode with each other.

During specific implementation, the second terminal may encrypt the random number and then send the random number, or may directly send the random number without encrypting the random number. This is not limited in the present invention.

S304. The first terminal establishes a wireless communication connection in the wireless connection mode to the second terminal based on the encryption key of the second terminal.

Figure 4:
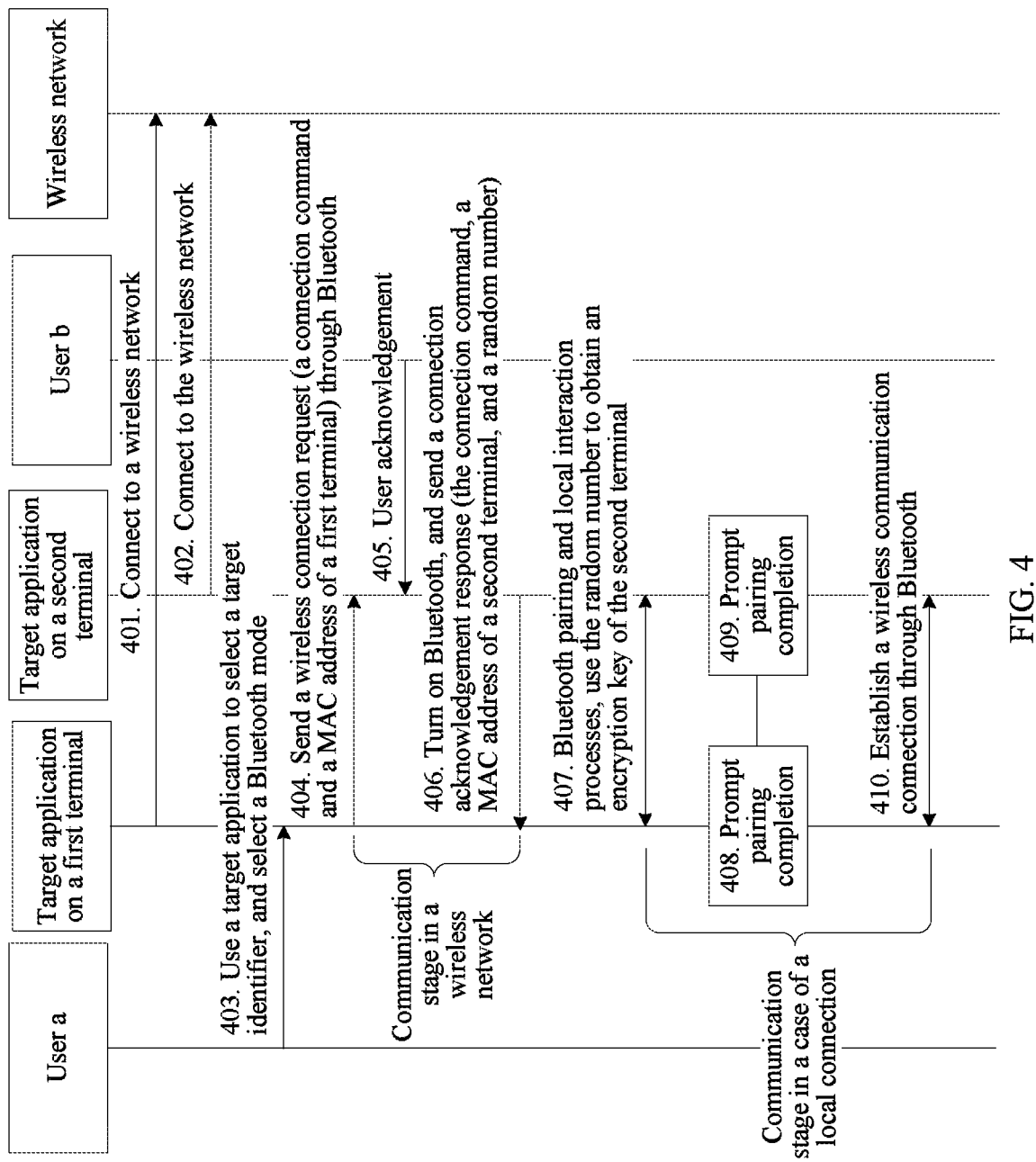
FIG. 4 is a schematic diagram of a scenario for wireless communication connection according to an embodiment of the present invention.

For example, FIG. 4 is a schematic diagram of a scenario for wireless communication connection according to an embodiment of the present invention. In FIG. 4, the wireless connection mode is specifically a Bluetooth based connection mode (a Bluetooth mode for short below). A user a and a user b may install the target application on the first terminal and the second terminal respectively. In step 401 and step 402, the first terminal is connected to a wireless network, and the second terminal is also connected to the wireless network. In step 403, the user a uses the target application on the first terminal to select a target identifier from an identifier list, and selects a Bluetooth mode as the wireless connection mode.

In step 404, the target application on the first terminal sends the wireless connection request for Bluetooth. The wireless connection request may include parameters such as a connection command and a MAC address of the first terminal. The connection command may enable the second terminal to learn of a type of the requested wireless connection mode. The MAC address of the first terminal may be used to establish a wireless communication connection in the Bluetooth mode.

In step 405, the user b performs acknowledgement in the target application on the second terminal. In step 406, the second terminal may detect whether Bluetooth has been turned on. If Bluetooth has not been turned on, the second terminal turns on Bluetooth, and sends a connection acknowledgement response to the target application on the first terminal. The connection acknowledgement response may include parameters such as the connection command, a MAC address of the second terminal, and a random number.

In step 407, the first terminal and the second terminal may perform Bluetooth pairing by using a local connection. Specifically, the second terminal and the first terminal may use the parameters such as the random number and the MAC address of the first terminal as input to obtain an encryption key of the second terminal through algorithm processing.

The algorithm may be any type of encryption algorithm. This is not limited in this embodiment of the present invention.

In step 408, after obtaining the encryption key of the second terminal, if Bluetooth verification succeeds, the target application on the first terminal may prompt pairing completion. In addition, in step 409, if Bluetooth verification succeeds, the target application on the second terminal may also prompt pairing completion.

In step 409, the first terminal may establish the wireless communication connection in the Bluetooth mode to the second terminal.

It should be noted that step 404 and step 406 may be at a communication stage in the wireless network, and step 407 and step 410 may be at a communication stage in a case of the local connection.

Optionally, the connection acknowledgement response to the connection request may further include the encryption key of the second terminal in the wireless connection mode. The establishing, by the first terminal, a wireless communication connection in the wireless connection mode to the second terminal may include: establishing, by the first terminal, the wireless communication connection in the wireless connection mode to the second terminal based on the encryption key of the second terminal.

It should be noted that if the connection acknowledgement response includes the encryption key of the second terminal in the wireless connection mode, the first terminal and the second terminal may not need to perform a local interaction process, and may establish the wireless communication connection in the wireless connection mode provided that password verification succeeds.

During specific implementation, the second terminal may encrypt the encryption key and then send the encryption key, or may directly send the encryption key without encrypting the encryption key. This is not limited in the present invention.

Figure 5:
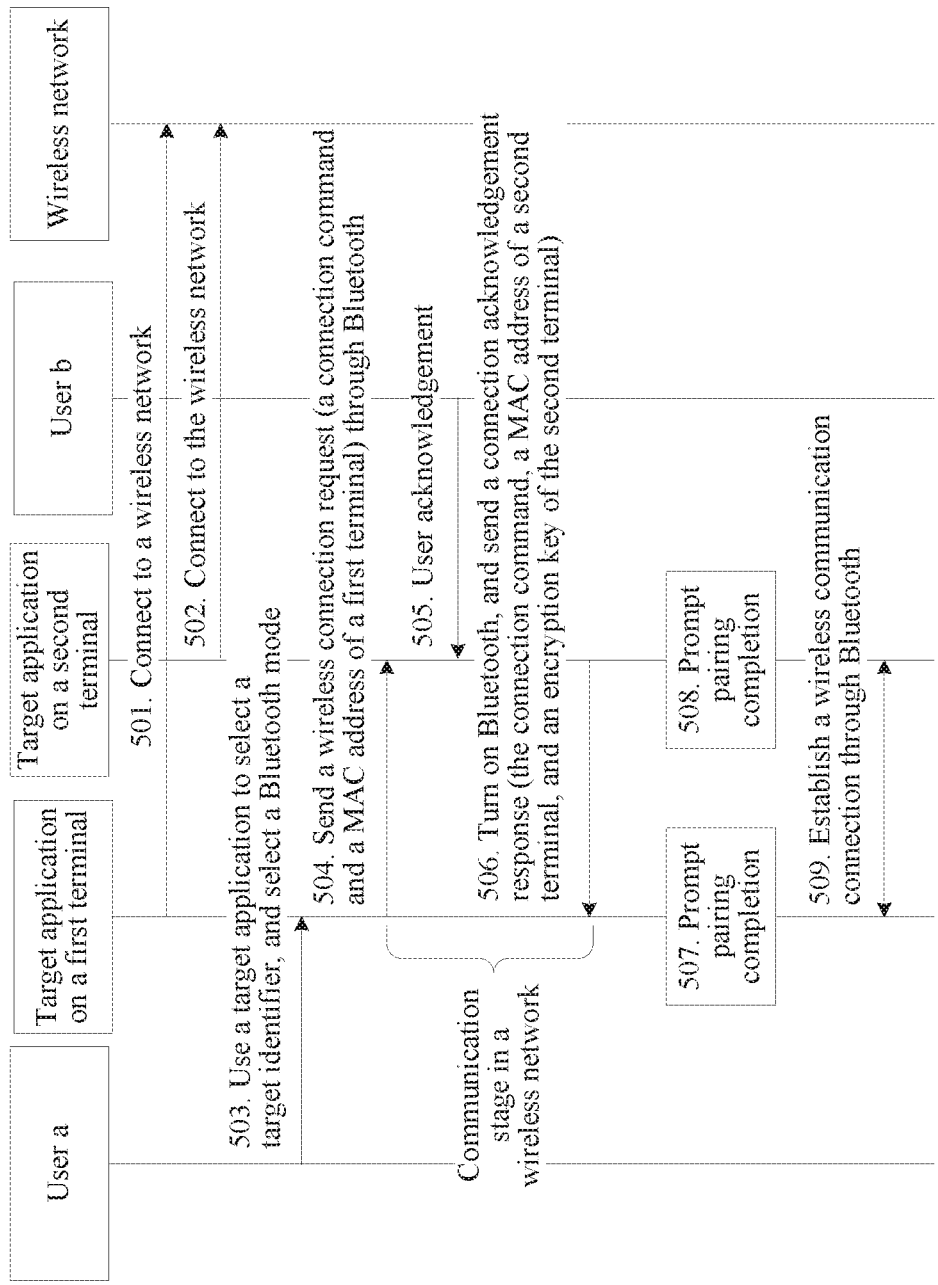
FIG. 5 is a schematic diagram of another scenario for wireless communication connection according to an embodiment of the present invention.

For example, FIG. 5 is a schematic diagram of another scenario for wireless communication connection according to an embodiment of the present invention. For a specific implementation process of step 501 to step 505 shown in FIG. 5, refer to a specific implementation process of step 401 to step 405 shown in FIG. 4, and details are not described herein again.

In step 506, the second terminal detects whether Bluetooth on the second terminal has been turned on. If Bluetooth has not been turned on, the second terminal turns on Bluetooth, and sends a connection acknowledgement response. The connection acknowledgement response may include a connection command, a MAC address of the second terminal, and an encryption key of the second terminal in the Bluetooth mode.

In step 507, the first terminal receives the connection acknowledgement response, and connects to Bluetooth on the second terminal based on the encryption key of the second terminal. If password verification succeeds, the target application on the first terminal prompts pairing completion. In addition, in step 508, if the connection succeeds, the target application on the second terminal also prompts pairing completion.

In step 509, the first terminal establishes the wireless communication connection in the Bluetooth mode to the second terminal.

In this embodiment of the present invention, the first terminal may initiate, to the second terminal, the wireless connection request for the wireless connection mode by using the target application, and receive the connection acknowledgement response of the second terminal by using the wireless network. In addition, in this process a parameter required for establishing the wireless communication connection is exchanged. In this way, the first terminal may establish the wireless communication connection in the wireless connection mode to the second terminal. A user of the first terminal may establish the wireless communication connection in the wireless connection mode, with no need to learn of the parameter such as the MAC address or a name of the second terminal in the wireless communication mode or to turn on the corresponding wireless connection mode on a dedicated setting interface and select a corresponding terminal, thereby simplifying an operation process of the user and improving terminal intelligence.

Figure 6:
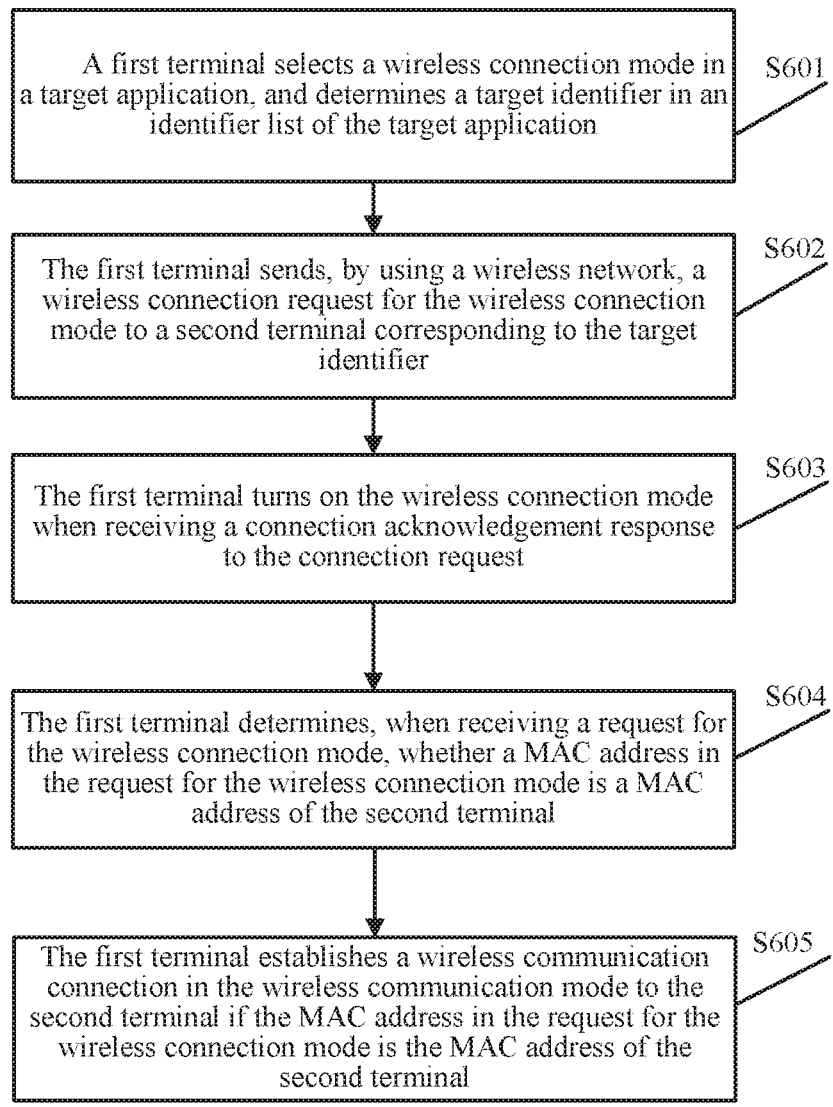
FIG. 6 is a schematic flowchart of still another wireless communication connection method according to an embodiment of the present invention.

FIG. 6 is a schematic flowchart of still another wireless communication connection method according to an embodiment of the present invention.

S601. A first terminal selects a wireless connection mode in a target application, and determines a target identifier in an identifier list of the target application.

S602. The first terminal sends, by using a wireless network, a wireless connection request for the wireless connection mode to a second terminal corresponding to the target identifier.

It should be noted that for a specific implementation process of step S601 and step S602 in this embodiment of the present invention, refer to step S201 and step S202 in the embodiment corresponding to FIG. 2, and details are not described herein again.

S603. The first terminal turns on the wireless connection mode when receiving a connection acknowledgement response to the connection request.

The connection acknowledgement response to the connection request includes a MAC address of the second terminal.

It should be noted that the wireless connection mode may be, for example, a WPS (Wi-Fi Protected Setup, Wi-Fi Protected Setup) based connection mode (a WPS mode for short below). In the WPS mode, a network name and an encryption key can be automatically configured for each terminal in a network. When connecting to a terminal with a WPS, a user can implement the connection only by turning on the WPS mode on an access terminal and an initiation terminal, with no need to understand concepts such as the network name and the encryption key or input a predicted password segment. In addition, because the encryption key is randomly generated, security performance is relatively high.

It should further be noted that alternatively, the wireless connection mode may be a Wi-Fi mode when the first terminal turns on a personal hotspot, or may be another wireless connection mode. This is not limited in the present invention.

During specific implementation, when receiving the connection acknowledgement response of the second terminal, the first terminal may detect, based on the connection acknowledgement response, whether the first terminal has turned on the wireless connection mode. If the wireless connection mode has not been turned on, the first terminal automatically turns on the wireless connection mode. If the wireless connection mode has been turned on, the first terminal may keep the wireless connection mode in the turn-on state.

S604. The first terminal determines, when receiving a request for the wireless connection mode, whether a MAC address in the request for the wireless connection mode is a MAC address of the second terminal.

It should be noted that the request for the wireless connection mode may be used to request to access the wireless network of the first terminal. In addition, the request for the wireless connection mode may be sent by the second terminal, or may be sent by another terminal. The request for the wireless connection mode may include a MAC address of a sending terminal.

During specific implementation, the first terminal may obtain the MAC address of the second terminal by using a wireless communication stage. Then, if a request for the wireless connection mode is received at a communication stage in a case of a local connection, the first terminal may determine whether a MAC address in the request is the MAC address obtained at the wireless communication stage. If yes, the second terminal may be allowed to locally access the wireless network (for example, WPS access is allowed). If no, the second terminal is not allowed to locally access the wireless network.

During specific implementation, when receiving a request for the wireless connection mode from any terminal, the first terminal may determine, at the communication stage in the case of the local connection, whether the MAC address in the request for the wireless connection mode is the same as an address (that is, the MAC address of the second terminal) in the connection acknowledgement response.

S605. The first terminal establishes a wireless communication connection in the wireless communication mode to the second terminal if the MAC address in the request for the wireless connection mode is the MAC address of the second terminal.

During specific implementation, if the MAC address in the request for the wireless connection mode is the same as the address (that is, the MAC address of the second terminal) in the connection acknowledgement response, the first terminal may determine that the second terminal initiates the connection, and may establish the wireless communication connection in the wireless communication mode to the second terminal.

It should further be noted that when determining that the MAC address in the request for the wireless connection mode is the MAC address of the second terminal, the first terminal establishes the wireless communication connection in the wireless connection mode to the second terminal. This can prevent wrong access of another terminal when the first terminal turns on the wireless connection mode and improve connection efficiency.

Figure 7:
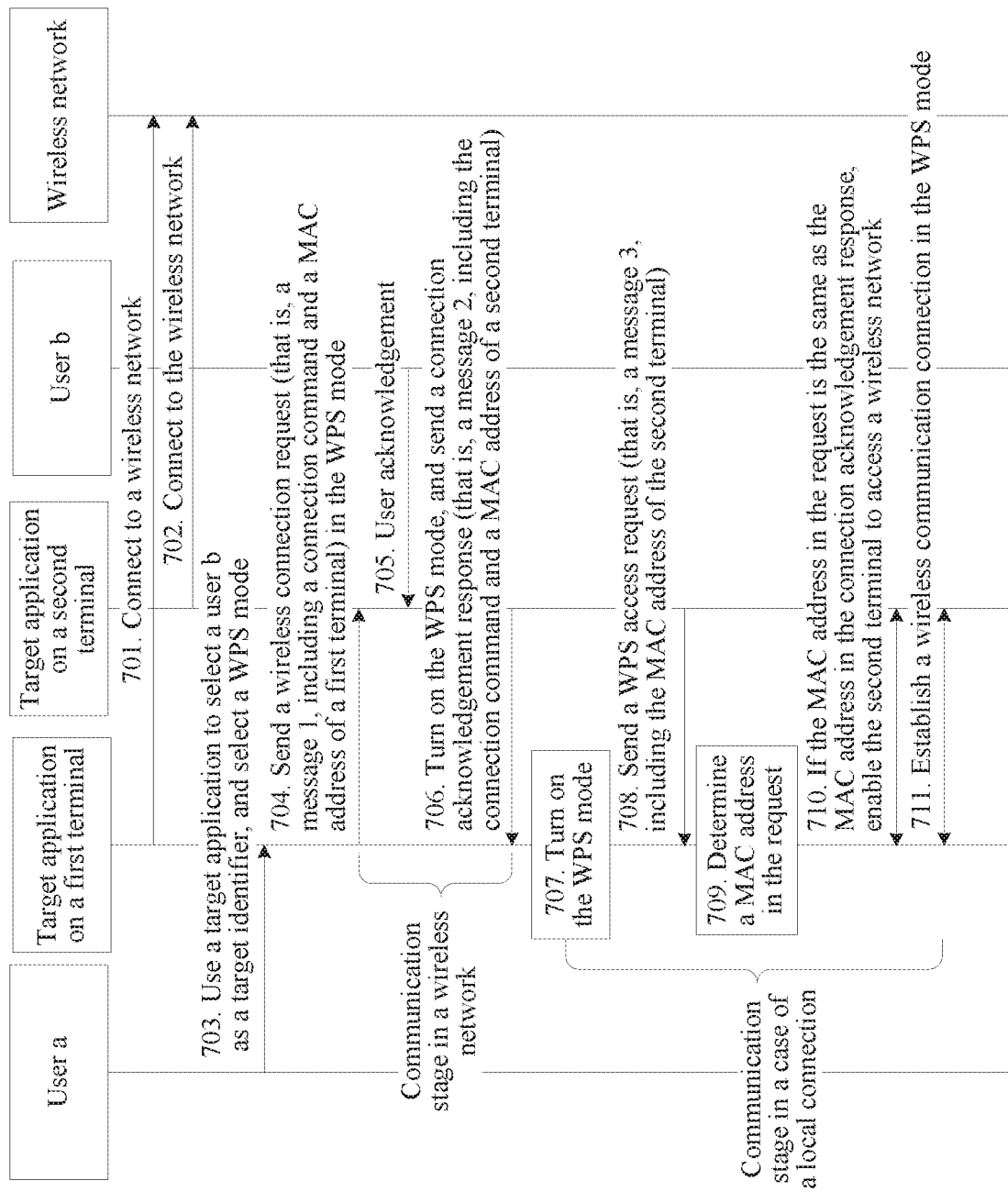
FIG. 7 is a schematic diagram of still another scenario for wireless communication connection according to an embodiment of the present invention.

For example, FIG. 7 is a schematic diagram of still another scenario for wireless communication connection according to an embodiment of the present invention. A user a and a user b may install the target application on the first terminal and the second terminal respectively. In step 701 and step 702, the first terminal is connected to a wireless network, and the second terminal is also connected to the wireless network. In step 703, the user a uses the target application on the first terminal to select a target identifier from an identifier list, and selects a WPS mode as the wireless connection mode.

In step 704, the target application on the first terminal sends a wireless connection request (that is, a message 1) in the WPS mode. The wireless connection request (that is, the message 1) may include parameters such as a connection command and a MAC address of the first terminal. The connection command may enable the second terminal to learn that a type of the requested wireless connection mode is the WPS mode. The MAC address of the first terminal may be used by the second terminal to accurately find the first terminal when sending a WPS access request.

In step 705, the user b performs acknowledgement in the target application on the second terminal. In step 706, the second terminal may detect whether the WPS mode has been turned on. If the WPS mode has not been turned on, the second terminal turns on the WPS mode, and sends a connection acknowledgement response (that is, a message 2) to the target application on the first terminal. The connection acknowledgement response (that is, the message 2) may include parameters such as the connection command and a MAC address of the second terminal.

In step 707, after receiving the connection acknowledgement response (that is, the message 2), the first terminal detects whether the first terminal has turned on the WPS mode. If the WPS mode has not been turned on, the first terminal turns on the WPS mode. If the WPS mode has been turned on, the first terminal keeps the WPS mode in the turn-on state.

In step 708, the second terminal sends a WPS access request (that is, a request for the wireless connection mode), namely, a message 3, to the first terminal.

In step 709, the first terminal receives the WPS access request (that is, the message 3), and determines whether a MAC address in the WPS access request is a MAC address of the second terminal in the connection acknowledgement response.

In step 710, if the first terminal determines that the MAC address in the request (the message 3) is the same as the MAC address in the connection acknowledgement response (that is, the message 2) and the MAC address of the second terminal, the first terminal may enable the second terminal to access the wireless network of the first terminal.

If the first terminal determines that the MAC address in the request is not the MAC address of the second terminal, the first terminal may not enable a terminal corresponding to the MAC address in the request to access the wireless network of the first terminal.

In step 711, the first terminal establishes the wireless communication connection in the WPS mode to the second terminal.

It should be noted that step 704 and step 706 may be at a communication stage in the wireless network, and step 707 to step 711 may be at a communication stage in a case of a local connection.

Optionally, when receiving the connection acknowledgement response to the connection request, the first terminal may further send a MAC address of a third terminal to the second terminal, and control the third terminal to enter the wireless connection mode, so that the second terminal establishes a wireless communication connection based on the MAC address of the third terminal when turning on the wireless connection mode.

It should be noted that the connection acknowledgement response may include the MAC address of the second terminal.

It should further be noted that the third terminal may be a router, a Wi-Fi transmission device, or the like. The first terminal may have established the wireless communication connection to the third terminal, and saved the MAC address of the third terminal. In addition, the first terminal may further obtain operation permission of the third terminal. In other words, the first terminal may control the third terminal without acknowledgement of the third terminal.

During specific implementation, when receiving the connection acknowledgement response to the connection request, the first terminal may accurately send the MAC address of the third terminal to the second terminal based on the MAC address of the second terminal in the connection acknowledgement response, and control the third terminal to enter the wireless connection mode. Further, the second terminal may receive the MAC address of the third terminal, and turn on the wireless connection mode. The second terminal may access a wireless network of the third terminal based on the MAC address of the third terminal, and establish the wireless communication connection to the third terminal.

For example, the wireless connection mode is a WPS mode. First, the first terminal establishes a wireless communication connection in the WPS mode to the third terminal, and saves the MAC address of the third terminal. Then, the first terminal obtains the operation permission of the third terminal, so that the user can control the third terminal on the first terminal. Further, the first terminal sends a connection request in the WPS mode to the second terminal, and sends the MAC address of the third terminal to the second terminal when receiving a connection acknowledgement response to the connection request from the second terminal. In addition, the first terminal controls the third terminal to turn on the WPS mode.

Further, the second terminal sends a WPS access request to the third terminal based on the MAC address of the third terminal. When receiving the WPS access request, the third terminal may enable the second terminal to access the WPS mode, and establish the wireless communication connection in the WPS mode to the second terminal.

In some feasible implementations, the second terminal may further send the request for accessing the wireless connection mode to the first terminal after sending the connection acknowledgement response. When receiving the request for the wireless connection mode, the first terminal controls the third terminal to enter the wireless connection mode, and forwards the request of the second terminal for accessing the wireless connection mode to the third terminal. When receiving the request, the third terminal enables the second terminal to access the wireless connection mode based on the MAC address in the request, and establishes the wireless communication connection in the wireless connection mode to the second terminal.

In some feasible implementations, the first terminal may further send an encryption key of the third terminal in the wireless connection mode and the MAC address of the third terminal to the second terminal when receiving the connection acknowledgement response to the connection request. When receiving the encryption key and the MAC address of the third terminal, the second terminal turns on the wireless connection mode, finds the third terminal through scanning based on the MAC address of the third terminal, and automatically inputs the encryption key. After verification of the encryption key succeeds, the second terminal may establish the wireless communication connection in the wireless connection mode to the third terminal.

In some feasible implementations, the third terminal may be a router. The first terminal may first establish a wireless communication connection to the router, and record a MAC address of the router. The first terminal sends a wireless connection request to the second terminal (where in this case, the wireless connection request carries the MAC address of the router). The second terminal saves the MAC address of the router after receiving the wireless connection request, turns on a WPS access mode on the second terminal, and then sends, to the first terminal, a connection acknowledgement response to the wireless connection request.

In some feasible implementations, when the first terminal receives the connection acknowledgement response to the wireless connection request, the first terminal notifies the router of a WPS mode turn-on command.

The WPS mode command may also include the MAC address of the second terminal in the acknowledgement response of the second terminal. When receiving a WPS turn-on request command sent by the first terminal, the router turns on the WPS mode, and prepares to interact with the second terminal through the WPS.

In some feasible implementations, when the wireless connection mode is a Wi-Fi connection mode, the connection acknowledgement response of the second terminal may include a PIN code. When receiving the connection acknowledgement response, the first terminal may connect to the wireless network of the second terminal based on the PIN code, and establish a wireless communication connection in the Wi-Fi connection mode to the second terminal.

Figure 8:
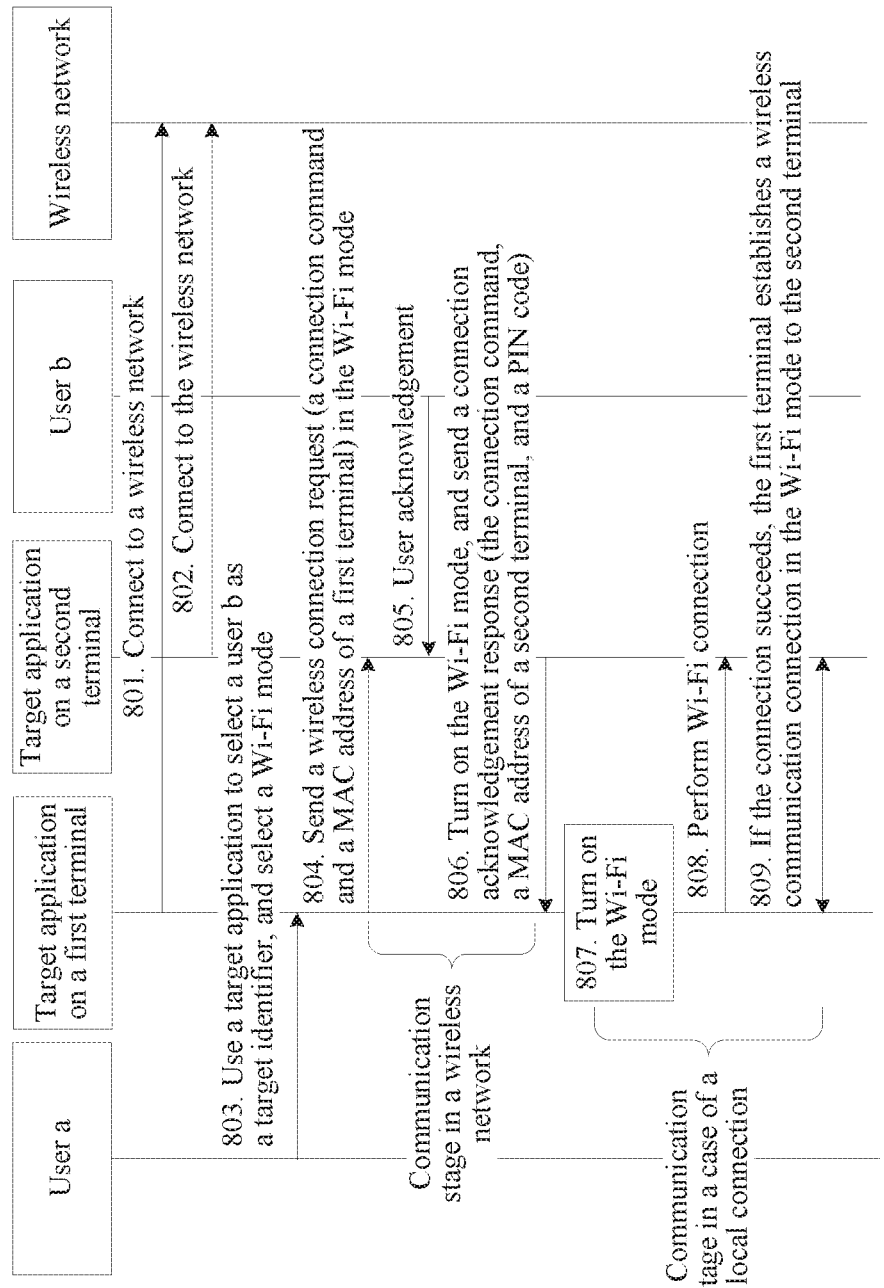
FIG. 8 is a schematic diagram of still another scenario for wireless communication connection according to an embodiment of the present invention.

For example, FIG. 8 is a schematic diagram of still another scenario for wireless communication connection according to an embodiment of the present invention. A user a and a user b may install the target application on the first terminal and the second terminal respectively. In step 801 and step 802, the first terminal is connected to a wireless network, and the second terminal is also connected to the wireless network. In step 803, the user a uses the target application on the first terminal to select the user b from the identifier list as a target identifier, and selects a Wi-Fi mode as the wireless connection mode.

In step 804, the target application on the first terminal sends a wireless connection request in the Wi-Fi mode. The wireless connection request may include parameters such as a connection command and a MAC address of the first terminal.

In step 805, the user b performs acknowledgement in the target application on the second terminal. In step 806, the second terminal may detect whether the Wi-Fi mode has been turned on. If the Wi-Fi mode has not been turned on, the second terminal turns on the Wi-Fi mode, and sends a connection acknowledgement response to the target application on the first terminal. The connection acknowledgement response may include parameters such as the connection command, a MAC address of the second terminal, and a PIN code.

The PIN code may be a Wi-Fi password or another password used for encryption. This is not limited in this embodiment of the present invention.

In step 807, after receiving the connection acknowledgement response, the first terminal detects whether the first terminal has turned on the Wi-Fi mode. If the Wi-Fi mode has not been turned on, the first terminal turns on the Wi-Fi mode. If the Wi-Fi mode has been turned on, the first terminal keeps the Wi-Fi mode in the turn-on state.

In step 808, the first terminal establishes a Wi-Fi connection to the second terminal, and automatically inputs the PIN code in the connection acknowledgement response, so that the second terminal verifies whether the PIN code is correct.

In step 809, if the second terminal verifies that the PIN code is correct, the second terminal may enable the first terminal to access the wireless network of the second terminal, and establish a wireless communication connection in the Wi-Fi mode to the first terminal.

If the second terminal verifies that the PIN code is incorrect, the second terminal may not enable the first terminal to access the wireless network of the second terminal.

It should be noted that step 804 and step 806 may be at a communication stage in the wireless network, and step 807 to step 809 may be at a communication stage in a case of a local connection.

In this embodiment of the present invention, the first terminal may initiate the wireless connection request for the wireless connection mode to the second terminal by using the target application, and receive the connection acknowledgement response of the second terminal by using the wireless network. In addition, in this process the parameter such as the MAC address required for establishing the wireless communication connection is exchanged. When the request for the wireless connection mode is received, whether the MAC address in the request for the wireless connection mode is the MAC address of the second terminal is determined. If yes, the first terminal may establish the wireless communication connection in the wireless connection mode to the second terminal. When determining that the MAC address in the request for the wireless connection mode is the MAC address of the second terminal, the first terminal may establish the wireless communication connection in the wireless connection mode to the second terminal. This can prevent wrong access of another terminal when the first terminal turns on the wireless connection mode and improve terminal intelligence.

Figure 9:
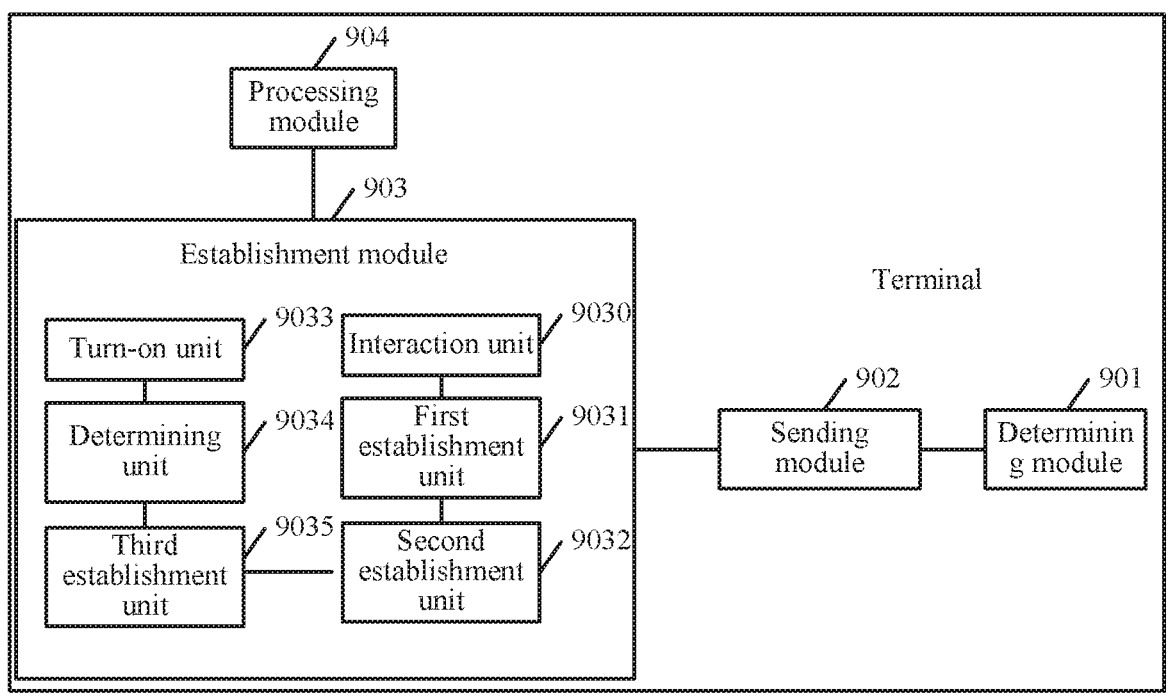
FIG. 9 is a schematic structural diagram of a terminal according to an embodiment of the present invention.

FIG. 9 is a schematic structural diagram of a terminal according to an embodiment of the present invention. The terminal shown in FIG. 9 may include:

a determining module 901, configured to select a wireless connection mode in a target application, and determine a target identifier in an identifier list of the target application;

a sending module 902, configured to send, by using a wireless network, a wireless connection request for the wireless connection mode to a second terminal corresponding to the target identifier; and an establishment module 903, configured to establish a wireless communication connection in the wireless connection mode to the second terminal when an acknowledgement response to the wireless connection request is received.

Optionally, the connection acknowledgement response to the connection request includes a random number generated by the second terminal in the wireless connection mode.

The establishment module 903 includes: an interaction unit 9030, configured to perform local connection interaction for the wireless connection mode with the second terminal by using the random number, to obtain an encryption key of the second terminal in the wireless connection mode; and a first establishment unit 9031, configured to establish the wireless communication connection in the wireless connection mode to the second terminal based on the encryption key of the second terminal.

Optionally, the connection acknowledgement response to the connection request includes an encryption key of the second terminal in the wireless connection mode.

The establishment module 903 includes a second establishment unit 9032, configured to establish the wireless communication connection in the wireless connection mode to the second terminal based on the encryption key of the second terminal.

Optionally, the connection acknowledgement response to the connection request includes a MAC address of the second terminal.

The establishment module 903 includes: a turn-on unit 9033, configured to turn on the wireless connection mode when the connection acknowledgement response to the connection request is received;

a determining unit 9034, configured to determine, when a request for the wireless connection mode is received, whether a MAC address in the request for the wireless connection mode is the MAC address of the second terminal; and a third establishment unit 9035, configured to establish the wireless communication connection in the wireless communication mode to the second terminal if the MAC address in the request for the wireless connection mode is the MAC address of the second terminal.

Optionally, the terminal further includes a processing module 904, configured to: when the connection acknowledgement response to the connection request is received, send a MAC address of a third terminal to the second terminal, and control the third terminal to enter the wireless connection mode, so that the second terminal establishes a wireless communication connection based on the MAC address of the third terminal when turning on the wireless connection mode.

Optionally, the wireless connection mode includes any one or more of a Bluetooth based connection mode, a WPS based connection mode, a Wi-Fi based connection mode, and an NFC based connection mode.

Optionally, the wireless network includes a cellular mobile data network and/or a wireless local area network.

In this embodiment of the present invention, the first terminal may initiate, to the second terminal, the wireless connection request for the wireless connection mode by using the target application, and receive the connection acknowledgement response of the second terminal by using the wireless network. In addition, in this process a parameter required for establishing the wireless communication connection is exchanged. In this way, the first terminal may establish the wireless communication connection in the wireless connection mode to the second terminal. A user of the first terminal may establish the wireless communication connection in the wireless connection mode, with no need to learn of the parameter such as the MAC address or a name of the second terminal in the wireless communication mode or to turn on the corresponding wireless connection mode on a dedicated setting interface and select a corresponding terminal, thereby simplifying an operation process of the user and improving terminal intelligence.

Figure 10:
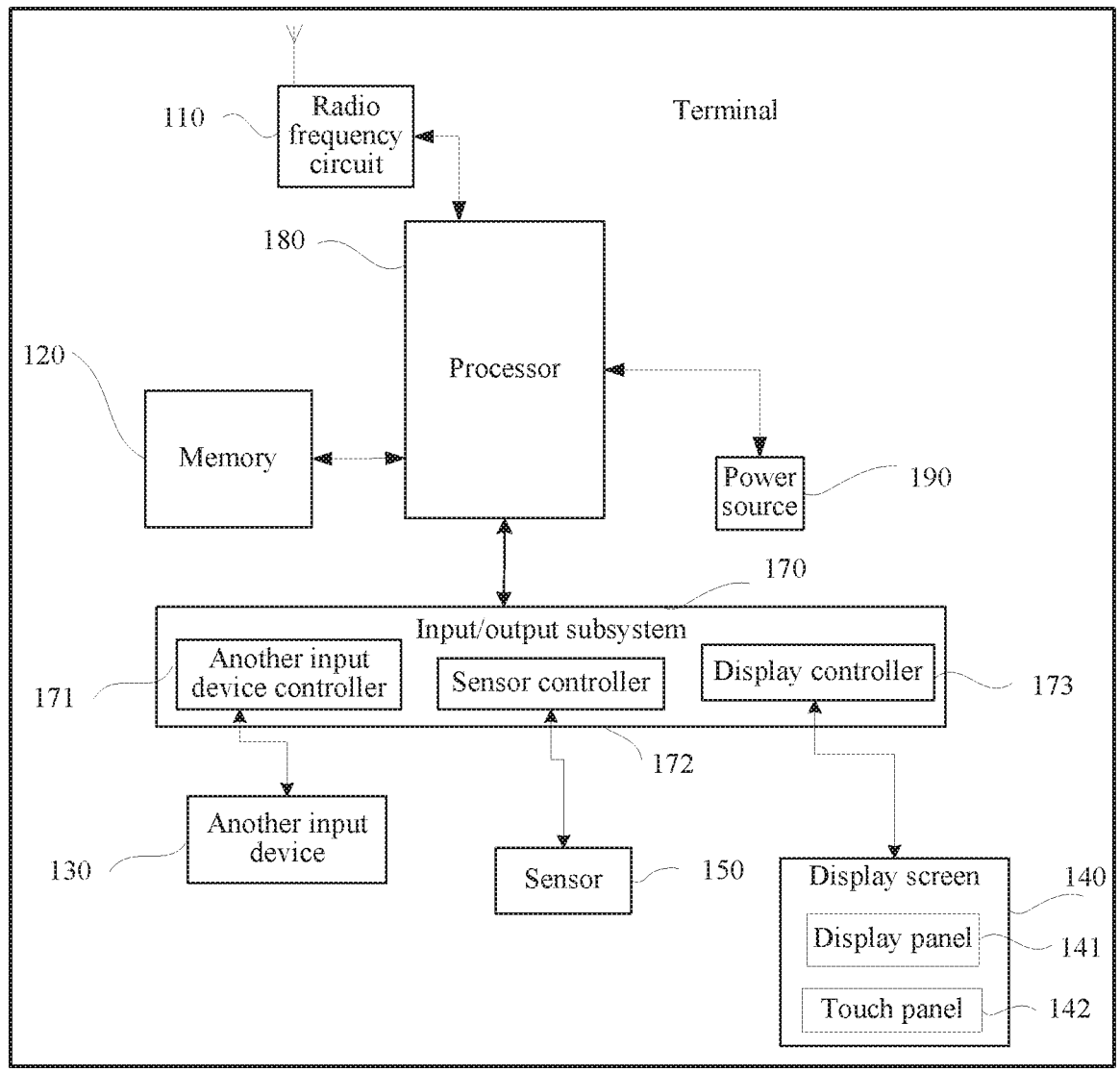
FIG. 10 is a schematic structural diagram of another terminal according to an embodiment of the present invention.

FIG. 10 is a schematic structural diagram of another terminal according to an embodiment of the present invention. The terminal described in this embodiment includes components such as a radio frequency (Radio Frequency, RF) circuit 110, a memory 120, another input device 130, a display screen 140, a sensor 150, an input/output subsystem 170, a processor 190, and a power source 190. A person skilled in the art may understand that the structure of the terminal shown in FIG. 9 does not constitute a limitation to the terminal, and the terminal may include more or fewer components than those shown in the figure, or some components may be combined, or some components may be separated, or a different component deployment may be used. A person skilled in the art may understand that the display screen 140 belongs to a user interface (UI, User Interface), and the terminal may include more or fewer user interfaces than those shown in the figure.

Components of the terminal are specifically described with reference to FIG. 9.

The radio frequency circuit 110 may be configured to receive and send information or receive and send a signal during a call process. Specifically, the RF circuit receives downlink information from a base station, then delivers the downlink information to the processor 180 for processing, and sends related uplink data to the base station. Generally, the radio frequency circuit includes but is not limited to an antenna, at least one amplifier, a transceiver, a coupler, an LNA (Low Noise Amplifier, low noise amplifier), a duplexer, and the like. In addition, the radio frequency circuit 110 may also communicate with a network and another device through wireless communication. The wireless communication may use any communication standard or protocol, including but not limited to: GSM (Global System of Mobile communication, Global System for Mobile Communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), LTE (Long Term Evolution. Long Term Evolution), e-mail, and SMS (Short Messaging Service, Short Messaging Service).

The memory 120 may be configured to store a software program and a module. The processor 180 runs the software program and the module that are stored in the memory 120, to perform various functional applications of the terminal and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal, and the like. In addition, the memory 120 may include a high-speed random access memory, and may further include a non-volatile memory, such as at least one magnetic disk storage device, a flash memory, or another volatile solid-state storage device.

The another input device 130 may be configured to receive input digit or character information, and generate a key signal input related to user settings and function control of the terminal. Specifically, the another input device 130 may include but is not limited to one or more of a physical keyboard, a function key (for example, a volume control key or a power on/off key), a trackball, a mouse, a joystick, and an optical mouse (the optical mouse is a touch-sensitive surface that does not display a visible output, or an extension of a touch-sensitive surface formed by a touchscreen). The another input device 130 is connected to another input device controller 171 of the input/output subsystem 170, and performs signal interaction with the processor 180 under control of the another device input controller 171.

The display screen 140 may be configured to display information entered by a user or information provided for a user and various menus on the terminal, and may further receive user input. Specifically, the display screen 140 may include a display panel 141 and a touch panel 142. The display panel 141 may be configured by using an LCD (Liquid Crystal Display, liquid crystal display), an OLED (Organic Light-Emitting Diode, organic light-emitting diode), or the like. The touch panel 142 is also referred to as a touchscreen, a touch-sensitive screen, or the like, and may collect a touch operation or non-touch operation of a user on or near the touch panel (such as an operation of a user on the touch panel 142 or near the touch panel 142 by using any suitable object or accessory such as a finger or a stylus, or including a motion sensing operation including operation types such as an isolated control operation and a multipoint control operation), and drives a corresponding connection apparatus according to a preset program. Optionally, the touch panel 142 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and sends the information to the processor 180, and can receive a command sent by the processor 180 and execute the command. In addition, the touch panel 142 may be implemented by using a resistive, capacitive, infrared, or surface sound wave type touch panel, or the touch panel 142 may be implemented by using any technology of future development. Further, the touch panel 142 may cover the display panel 141. The user may perform, based on content (the displayed content includes but is not limited to a soft keyboard, a virtual mouse, a virtual key, an icon, and the like) displayed on the display panel 141, an operation on or near the touch panel 142 covering the display panel 141. After detecting the operation on or near the touch panel 142, the touch panel 142 transfers the operation to the processor 180 by using the input/output subsystem 170, to determine the user input. Subsequently, the processor 180 provides a corresponding visual output on the display panel 141 by using the input/output subsystem 170 based on the user input. Although, in FIG. 4, the touch panel 142 and the display panel 141 are used as two separate parts to implement input and output functions of the terminal, in some embodiments, the touch panel 142 and the display panel 141 may be integrated to implement the input and output functions of the terminal.

The terminal may further include at least one sensor 150, for example, an optical sensor, a speed sensor, a GPS sensor, and another sensor. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal is moved to the ear. As one type of speed sensor, an accelerometer sensor may detect magnitude of accelerations in various directions (usually on three axes), may detect magnitude and a direction of the gravity when static, and may be configured to identify an application of a terminal gesture (such as switchover between horizontal and vertical screens, a related game, and magnetometer posture calibration), a function related to vibration recognition (such as a pedometer and a knock), and the like. Other sensors such as a gyroscope, a barometer, a hygrometer, a thermometer, and an infrared sensor, which may be configured in the terminal, are not described herein again.

The input/output subsystem 170 is configured to control an external input/output device, and may include the another device input controller 171, a sensor controller 172, a display controller 173. Optionally, one or more another input control device controllers 171 receive a signal from the another input device 130 and/or send a signal to the another input device 130. The another input device 130 may include a physical button (a pressing button, a rocker button, and the like), a dial pad, a slider switch, a joystick, a click scroll wheel, or an optical mouse (the optical mouse is a touch-sensitive surface that does not display a visible output, or an extension of a touch-sensitive surface formed by a touchscreen). It should be noted that the another input control device controller 171 may be connected to any one or more of the foregoing devices. The display controller 173 of the input/output subsystem 170 receives a signal from the display screen 140 and/or sends a signal to the display screen 140. After the display screen 140 detects the user input, the display controller 173 converts the detected user input into interaction with an object displayed on the user interface of the display screen 140. That is, man-machine interaction is implemented. The sensor controller 172 may receive a signal from one or more sensors 150 and/or may send a signal to the one or more sensors 150.

The processor 180 is a control center of the terminal, and is connected to various parts of the entire terminal by using various interfaces and wires. By running or executing the software program and/or the module stored in the memory 120, and invoking data stored in the memory 120, the processor 180 performs various functions of the terminal and processes data, thereby performing overall monitoring on the terminal. Optionally, the processor 180 may include one or more processing units. Preferably, the processor 180 may integrate an application processor and a modem processor. The application processor mainly processes an operating system, a user interface, an application program, and the like. The modem processor mainly processes wireless communication. It may be understood that the foregoing modem processor may alternatively not be integrated into the processor 180.

The terminal further includes the power source 190 (such as a battery) for supplying power to the components. Preferably, the power source may be logically connected to the processor 180 by using a power management system, thereby implementing functions such as charging, discharging and power consumption management by using the power management system.

Although not shown in the figure, the terminal may further include a camera, a Bluetooth module, and the like, which are not described herein again.

Specifically, the processor 180 may invoke a program instruction stored in the memory 120, to implement the method in the embodiments of the present invention.

Specifically, the processor 180 is configured to: select a wireless connection mode in a target application, and determine a target identifier in an identifier list of the target application; send, by using a wireless network, a wireless connection request for the wireless connection mode to a second terminal corresponding to the target identifier; and establish, by the first terminal, a wireless communication connection in the wireless connection mode to the second terminal when a connection acknowledgement response to the wireless connection request is received.

The method performed by the processor in this embodiment of the present invention is described from a perspective of the processor. It may be understood that the processor in this embodiment of the present invention needs to cooperate with another hardware structure to perform the foregoing method. For example, when the terminal interacts with another device or a server, for example, sends the wireless connection request for the wireless connection mode to the second terminal corresponding to the target identifier, the processor 180 controls the radio frequency circuit 110 to receive related data. A specific implementation process is neither described in detail nor limited in this embodiment of the present invention.

Optionally, the connection acknowledgement response to the connection request includes a random number generated by the second terminal in the wireless connection mode.

The processor 180 is specifically configured to: perform local connection interaction for the wireless connection mode with the second terminal by using the random number, to obtain an encryption key of the second terminal in the wireless connection mode; and establish the wireless communication connection in the wireless connection mode to the second terminal based on the encryption key of the second terminal.

Optionally, the connection acknowledgement response to the connection request includes an encryption key of the second terminal in the wireless connection mode.

The processor 180 is specifically configured to establish the wireless communication connection in the wireless connection mode to the second terminal based on the encryption key of the second terminal.

Optionally, the connection acknowledgement response to the connection request includes a MAC address of the second terminal.

The processor 180 is specifically configured to: turn on the wireless connection mode when receiving the connection acknowledgement response to the connection request; determine, when receiving a request for the wireless connection mode, whether a MAC address in the request for the wireless connection mode is the MAC address of the second terminal; and establish, by the first terminal, the wireless communication connection in the wireless communication mode to the second terminal if the MAC address in the request for the wireless connection mode is the MAC address of the second terminal.

Optionally, the processor 180 is further configured to: when the connection acknowledgement response to the connection request is received, send a MAC address of a third terminal to the second terminal, and control the third terminal to enter the wireless connection mode, so that the second terminal establishes a wireless communication connection based on the MAC address of the third terminal when turning on the wireless connection mode.

Optionally, the wireless connection mode includes any one or more of a Bluetooth based connection mode, a WPS based connection mode, a Wi-Fi based connection mode, and an NFC based connection mode.

Optionally, the wireless network includes a cellular mobile data network and/or a wireless local area network.

In this embodiment of the present invention, the terminal may initiate, to the second terminal, the wireless connection request for the wireless connection mode by using the target application, and receive the connection acknowledgement response of the second terminal by using the wireless network. In addition, in this process a parameter required for establishing the wireless communication connection is exchanged. In this way, the terminal may establish the wireless communication connection in the wireless connection mode to the second terminal. A user of the first terminal may establish the wireless communication connection in the wireless connection mode, with no need to learn of the parameter such as the MAC address or a name of the second terminal in the wireless communication mode or to turn on the corresponding wireless connection mode on a dedicated setting interface and select a corresponding terminal, thereby simplifying an operation process of the user and improving terminal intelligence.

Another embodiment of the present invention provides a computer-readable storage medium. The computer-readable storage medium stores a computer program. When executed by a processor, the computer program may implement: selecting a wireless connection mode in a target application, and determining a target identifier in an identifier list of the target application; sending, by using a wireless network, a wireless connection request for the wireless connection mode to a second terminal corresponding to the target identifier; and establishing a wireless communication connection in the wireless connection mode to the second terminal when a connection acknowledgement response to the wireless connection request is received.

It should be noted that for a specific process in which the computer-readable storage medium is executed by the processor, refer to the methods described in the second embodiment and the third embodiment, and details are not described herein again.

Still another embodiment of the present invention provides a computer program product including an instruction. When running on a computer, the computer program product enables the computer to perform the following operations: selecting a wireless connection mode in a target application, and determining a target identifier in an identifier list of the target application; sending, by using a wireless network, a wireless connection request for the wireless connection mode to a second terminal corresponding to the target identifier; and establishing a wireless communication connection in the wireless connection mode to the second terminal when a connection acknowledgement response to the wireless connection request is received.

The computer-readable storage medium may be any internal storage unit of the terminal described in any one of the foregoing embodiments, for example, a hard disk or a main memory of the terminal. The computer-readable storage medium may alternatively be an external storage device of the terminal, for example, a removable hard disk, a smart memory card (Smart Media Card, SMC), a secure digital (Secure Digital, SD) card, or a flash card (Flash Card) equipped on the terminal. Further, alternatively, the computer-readable storage medium may include both an internal storage unit and an external storage device of the terminal. The computer-readable storage medium is configured to store the computer program and another program and data that are required by the terminal. The computer-readable storage medium may further be configured to temporarily store data that has been output or data to be output.

It should be noted that for a specific implementation process of the computer program product including the instruction, refer to the methods described in the second embodiment and the third embodiment, and details are not described herein again.

Based on the same inventive concept, a principle of resolving a problem by the terminal provided in the embodiments of the present invention is similar to that in the method embodiments of the present invention. Therefore, for implementation of the terminal, refer to implementation of the method. For brevity, details are not described herein again.

The invention claimed is:

1. A wireless communication coupling method, implemented by a first terminal, the wireless communication coupling method comprising:
    selecting a wireless coupling mode in a target application;
    determining a target identifier in an identifier list of the target application;
    sending, using a wireless network, a wireless coupling request for the wireless coupling mode to a second terminal, wherein the second terminal corresponds to the target identifier;
    receiving, in response to the wireless coupling request, a coupling acknowledgement response comprising a first media access control (MAC) address of the second terminal;
    entering a wireless coupling mode;
    receiving a second MAC address;
    determining that the second MAC address is the same as the first MAC address; and
    establishing a wireless communication coupling in the wireless coupling mode to the second terminal.

2. The wireless communication coupling method of claim 1, wherein the coupling acknowledgement response comprises a random number generated by the second terminal in the wireless coupling mode, and wherein establishing the wireless communication coupling comprises:
    performing local coupling interaction for the wireless coupling mode with the second terminal using the random number to obtain an encryption key of the second terminal in the wireless coupling mode; and
    establishing the wireless communication coupling in the wireless coupling mode to the second terminal based on the encryption key.

3. The wireless communication coupling method of claim 1, wherein the coupling acknowledgement response comprises an encryption key of the second terminal in the wireless coupling mode, and wherein establishing the wireless communication coupling comprises establishing the wireless communication coupling in the wireless coupling mode to the second terminal based on the encryption key.

4. The wireless communication coupling method of claim 1, wherein when receiving the coupling acknowledgement response, the wireless communication coupling method further comprises:
    sending a media access control (MAC) address of a third terminal to the second terminal; and
    controlling the third terminal to enter the wireless coupling mode.

5. The wireless communication coupling method of claim 1, wherein the target application comprises a social media application.

6. The wireless communication coupling method of claim 1, wherein the wireless coupling mode comprises a low-power short-range coupling mode.

7. The wireless communication coupling method of claim 1, wherein the wireless coupling mode comprises a WI-FI based coupling mode.

8. A first terminal, comprising:
    a non-transitory memory configured to store computer executable instructions; and
    a processor coupled to the non-transitory memory and configured to execute the computer executable instructions, which cause the first terminal to:
    select a wireless coupling mode in a target application;
    determine a target identifier in an identifier list of the target application;
    send, using a wireless network, a wireless coupling request for the wireless coupling mode to a second terminal, wherein the second terminal corresponds to the target identifier;
    receive, in response to the wireless coupling request, a coupling acknowledgement response comprising a first media access control (MAC) address of the second terminal;
    enter a wireless coupling mode;
    receive a second MAC address;
    determine that the second MAC address is the same as the first MAC address; and
    establish a wireless communication coupling in the wireless coupling mode to the second terminal.

9. The first terminal of claim 8, wherein the coupling acknowledgement response comprises a random number of the second terminal in the wireless coupling mode, and wherein the computer executable instructions, when executed by the processor, further cause the first terminal to:
    perform local coupling interaction for the wireless coupling mode with the second terminal using the random number to obtain an encryption key of the second terminal in the wireless coupling mode; and
    establish the wireless communication coupling in the wireless coupling mode to the second terminal based on the encryption key.

10. The first terminal of claim 8, wherein the coupling acknowledgement response comprises an encryption key of the second terminal in the wireless coupling mode, and wherein the computer executable instructions, when executed by the processor, further cause the first terminal to establish the wireless communication coupling in the wireless coupling mode to the second terminal based on the encryption key.

11. The first terminal of claim 8, wherein when receiving the coupling acknowledgement response, the computer executable instructions, when executed by the processor, further cause the first terminal to:
- send a media access control (MAC) address of a third terminal to the second terminal; and
- control the third terminal to enter the wireless coupling mode.

12. The first terminal of claim 8, wherein the wireless coupling mode comprises a low-power short-range coupling mode.

13. The first terminal of claim 8, wherein the wireless coupling mode comprises a WI-FI based coupling mode.

14. A computer program product comprising computer-executable instructions for storage on a non-transitory computer-readable medium that, when executed by a processor, cause a first terminal to:
- select a wireless coupling mode in a target application;
- determine a target identifier in an identifier list of the target application;
- send, using a wireless network, a wireless coupling request for the wireless coupling mode to a second terminal, wherein the second terminal corresponds to the target identifier;
- receive, in response to the wireless coupling request, a coupling acknowledgement response comprising a first media access control (MAC) address of the second terminal;
- enter a wireless coupling mode;
- receive a second MAC address;
- determine that the second MAC address is the same as the first MAC address; and
- establish a wireless communication coupling in the wireless coupling mode to the second terminal.

15. The computer program product of claim 14, wherein the coupling acknowledgement response comprises a random number generated by the second terminal in the wireless coupling mode, and wherein the computer-executable instructions further cause the first terminal to:
- perform local coupling interaction for the wireless coupling mode with the second terminal using the random number to obtain an encryption key of the second terminal in the wireless coupling mode; and
- establish the wireless communication coupling in the wireless coupling mode to the second terminal based on the encryption key.

16. The computer program product of claim 14, wherein the coupling acknowledgement response comprises an encryption key of the second terminal in the wireless coupling mode, and wherein the computer-executable instructions further cause the first terminal to establish the wireless communication coupling in the wireless coupling mode to the second terminal based on the encryption key.

17. The computer program product of claim 14, wherein when receiving the coupling acknowledgement response, the computer-executable instructions further cause the first terminal to:
- send a media access control (MAC) address of a third terminal to the second terminal; and
- control the third terminal to enter the wireless coupling mode.

* * * * *